(12) United States Patent
Broquet et al.

(10) Patent No.: US 8,374,734 B2
(45) Date of Patent: Feb. 12, 2013

(54) METHOD OF CONTROLLING AN AIRCRAFT, THE METHOD IMPLEMENTING A VOTE SYSTEM

(75) Inventors: Alexandre Broquet, Toulouse (FR); Fabien Cases, Toulouse (FR); Fabien Pascal, Donneville (FR)

(73) Assignee: Airbus Operations, Toulouse (FR)

( * ) Notice: Subject to any disclaimer, the term of this patent is extended or adjusted under 35 U.S.C. 154(b) by 648 days.

(21) Appl. No.: 12/686,780

(22) Filed: Jan. 13, 2010

(65) Prior Publication Data

US 2010/0185343 A1 Jul. 22, 2010

(30) Foreign Application Priority Data

Jan. 20, 2009 (FR) ..................... 09 50333

(51) Int. Cl.
*G01C 23/00* (2006.01)
*G05D 1/00* (2006.01)
(52) U.S. Cl. ......................................................... 701/3
(58) Field of Classification Search .................. 701/3, 8, 701/9, 14; 700/30, 78–80; 702/188; 714/100
See application file for complete search history.

(56) References Cited

U.S. PATENT DOCUMENTS

| | | | |
|---|---|---|---|
| 2001/0025351 A1* | 9/2001 | Kursawe et al. | 714/4 |
| 2004/0006398 A1* | 1/2004 | Bickford | 700/30 |
| 2004/0078171 A1* | 4/2004 | Wegerich et al. | 702/188 |
| 2005/0174073 A1 | 8/2005 | Garnaud et al. | |
| 2008/0288130 A1 | 11/2008 | Feau | |

FOREIGN PATENT DOCUMENTS

| | | |
|---|---|---|
| EP | 0 393 730 A1 | 10/1990 |
| FR | 2 850 356 A1 | 7/2004 |
| FR | 2 916 290 A1 | 11/2008 |

OTHER PUBLICATIONS

Calia et al.; "Air Data Failure Management in a Full-Authority Fly-By-Wire Control System;" *Proceedings of the 2006 IEEE International Conference on Control Applications*; 2006; pp. 3277-3281.
French Search Report for Application No. FR 0950333, issued Oct. 29, 2009. (w/ Translation).

\* cited by examiner

*Primary Examiner* — Mary Cheung
(74) *Attorney, Agent, or Firm* — Oliff & Berridge, PLC

(57) ABSTRACT

In the method of controlling an aircraft, a device implements the steps consisting in determining a first global value on the basis of only some amongst first individual values calculated by respective applications, modifying at least one parameter to take account of how the determination step took place and determining a second global value on the basis of second individual values calculated by the respective applications and on the basis of the parameter(s).

13 Claims, 1 Drawing Sheet

METHOD OF CONTROLLING AN AIRCRAFT, THE METHOD IMPLEMENTING A VOTE SYSTEM

BACKGROUND

1. Field of the Invention

The invention relates to controlling aircraft.

2. Description of Related Art

The control of an aircraft such as a jumbo jet nowadays involves on-board computers. To improve control safety, it is known to base control architecture on a vote system comprising a plurality of instances together with an arbiter or "voter".

Such a vote system includes at least two applications or channels of identical function: delivering an output value. Each application delivers the output it obtains using its own calculation algorithm. The architecture also includes an application that manages or monitors the other applications: this is referred to as the voter. Each application consists in software implemented on a computer. As a function of the collected outputs, the voter determines which output is finally to be forwarded to the airplane control circuit.

Voting may be based on the majority principle or on the unanimity principle. A vote based on the unanimity principle has the advantage that, providing a result is indeed obtained, then that result is reputed to be very reliable. However this principle has the drawback of not tolerating the slightest failure. Thus, as soon as one of the applications delivers an output that is different from the others, unanimity can no longer be achieved and voting leads to no result and no command can be forwarded. That is why vote systems generally obey the majority principle.

Furthermore, vote systems comprising one voter and two applications are of little interest since any disagreements between the applications leads to a tied vote. The voter is therefore generally associated with three or more applications.

That is why it is preferable to use a vote system comprising a voter and more than two channels, and based on the majority principle. This is the configuration considered below even though the invention is not limited to such conditions.

In a data processor system on board an airplane for generating a command, the voter is located downstream from the applications (which perform the major fraction of the function) and immediately upstream from the system that is to make use of the result of the vote.

The voter generally performs the following steps:

step 1: reading the output values from each of the applications. This assumes that the applications are synchronized or that they deliver their output values within a certain time after the first application transmits its output value;

step 2: comparing the output values of the application. In the nominal situation, the applications have used the same raw data and have implemented the same logical processing. They therefore deliver the same output value;

step 3: eliminating wrong output values. To do this, only the information delivered by a majority of the applications is conserved. Furthermore, if an application does not respond in time, its output value is not taken into consideration; and step 4: transferring the output value of the function to the application that is situated downstream for processing in the control system.

When the output values delivered by the applications are compared, a certain amount of tolerance should be allowed, in particular when the output is in the form of a high precision numerical value, so as to ensure that small differences are not considered as errors.

Nowadays, vote systems constitute an architecture that is conventional and they are known for their high integrity. In the aviation industry in particular, airplane flight control systems require a high level of integrity. That is why their architectures are generally fault-tolerant. More precisely, they may comprise three main channels together with two to three backup channels, and finally a degraded mode control module, i.e. a function that is used in the event of all of the other channels failing.

Nevertheless, other architectures are known in aviation.

The first is used for calculating air speed and altitude. This is not a genuine vote system since the output value delivered by each channel is not subjected to any qualification. Only a mean or median value is calculated. In the event of one of the channels failing, the result that is obtained remains close enough to the real value because of the other two channels.

A second type of vote is used for consolidating data, e.g. in the context of aircraft environment alerts, aircraft position calculation (taking a vote between global positioning system (GPS) values as delivered by satellites in order to eliminate the worst values), ADR monitoring (to eliminate inputs that are wrong because of failure of parts of their environment), and verifying the state of the aircraft (e.g. tests to determine whether the aircraft is on the ground). ADR is short for "air data reference" and concerns reference aerodynamic data (altitude, air speed, angle of incidence, etc.), i.e. data that is reputed to be accurate and that is used by the airplane as a whole.

Certain alerts relating to the airplane environment are issued by data delivered by a group of three computers. To take account of the risks of failure or wrong calculation, a specific mode of voting is implemented that is a combination of a standard vote and a vote with consensus. Thus, for each output value delivered by these computers, the voter verifies whether the value has been sent recently (if the value has not been refreshed, the computer is considered as having failed, otherwise the value is reputed to be up to date), and it verifies whether the value lies in a specific range (if so the data is considered as being "normal"). Therefore, the voter compares the up-to-date value (other values being eliminated) and establishes a consensus by determining the mean value, the median value, or the greatest value depending on the states of the three computers.

To compute the position of the airplane, values are used that come from twenty-four satellites in the GAS system. The positioning system then determines the best value by comparing all of the inputs. To do this, it begins by calculating the position of the airplane while taking account of all of the satellites. Thereafter, it calculates the position of the airplane twenty-four times, each time eliminating a different one of the satellites. Thereafter, it calculates the position of the airplane five hundred fifty-two times, each time eliminating a different pair of satellites. Finally, it makes use of the results of the calculation to determine the best position. It can thus be considered that the positioning system implements a vote by consensus.

Airplane state tests, such as those seeking to determine whether the airplane is on the ground, makes use of various data sources that take specific values when the airplane is in the state under consideration. If at least three parameters take these values (or indeed four in certain specific configurations), then the airplane is considered as being in the assumed state. For example, the airplane is considered as being on the ground if:

its altitude is the same as the altitude of the ground;

its ground speed is less than a given value;

its air speed is less than a given value;

the pressure on its landing gear is greater than a given value; and one of its doors is open.

The invention also applies to space vehicles. Thus, a voting process can be implemented in the context of controlling various functions such as flight control, control and monitoring of an automatic transfer vehicle, temperature control, management of energy supplies, communication with the ground, trajectory corrections, and transfers of fuel.

Vote systems may also be used within road vehicles or on board rail vehicles.

Certain limits of known vote systems appear when examining the consequences of failure of one of the channels. In other words, failure of one of the applications or of one of the pieces of equipment or systems that deliver data to the application. Consideration is given below to two types of architecture regardless of the number of channels they have.

cations hosted by the computers. During steps 2 and 3, the voter compares the values and eliminates wrong values, labeling them as such. In step 4, the voter forwards the result of the function in the form of a single global data value that is delivered to the following application that serves to make use of it for control purposes.

Tables 1 to 6 show various scenarios. There is therefore no chronological connection between their various rows.

The nominal scenario occurs when all of the applications are working on the basis of the same data and are applying the same computation logic. An erroneous channel is considered as being a channel that delivers a wrong value. Erroneous channels may themselves be incoherent, i.e. different erroneous channels may deliver different wrong values. A lost channel is a channel that has not delivered any value to the voter. An individual data value is a value transmitted by an application to the voter. A global data value is a data value forwarded by the voter to the downstream control device.

It is assumed below that the true value is data of value "10" such that the vote system ought normally to deliver the value "10" as the global data value.

TABLE 1

| Scenario | Step 1 | Step 2 & 3 | Step 4 |
|---|---|---|---|
| Nominal | A→10, B→10, C→10 → Voter | √10, √10, √10 → Voter | Voter → 10 |
| 1 erroneous channel | A→10, B→10, C→8 → Voter | √10, √10, x8 → Voter | Voter → 10 |
| 1 channel lost | A→10, B→10, C✗ → Voter | √10, √10 → Voter | Voter → 10 |
| 2 erroneous incoherent channels | A→10, B→8, C→13 → Voter | ?10, ?8, ?13 → Voter | Voter → ? |

In the scenarios considered below, matters are simplified by assuming that the applications deliver output values of Boolean type. Nevertheless, the invention is not restricted to values of this type.

Failure Conditions for a Three-Channel Architecture

The table below shows various failure scenarios in the presence of a voter that receives a plurality of numerical inputs. To simplify, no tolerance is implemented in any of these scenarios.

In this table and in the subsequent tables, step 1 is the step during which the voter receives values coming from the applications Thus, in the nominal scenario, all of the applications deliver individual data values of "10" to the voter, which qualifies them all as being valid and forwards the global data value "10" in step 4.

In the second row, if one channel is erroneous and delivers the value "8", then this is detected as being in the minority by the voter, which therefore qualifies it as erroneous, and the voter forwards the global value "10".

Likewise, in the following row, if one channel is lost, then the voter processes only two values and forwards the value "10".

Finally, in the last row, the voter is faced with three values "10", "8", and "13", and can therefore not qualify any of them since there is no majority, and it is therefore not in a position to supply a global data value to the downstream application. Of the four scenarios considered, it can thus be seen that only this scenario leads to the voter not being in a position to continue processing the data at the end of step 3 and therefore being unable to accomplish step 4.

This inability to deliver a data value is a risk that is presented by most known vote systems, given the way they are designed. To mitigate this risk, it is possible to provide an additional logic stage that enables the voter nevertheless to continue processing data. This is shown in the first three rows of Table 2.

TABLE 2

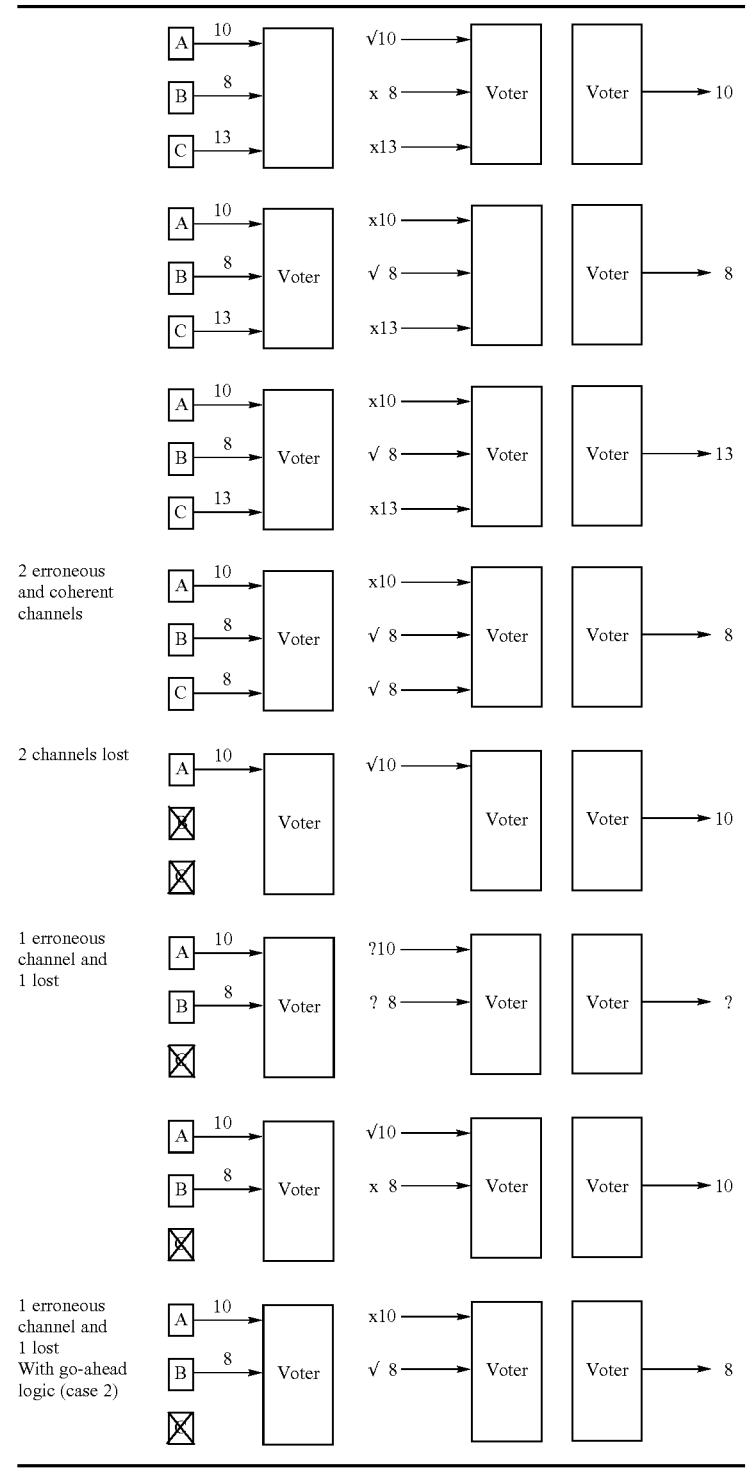

Thus, in the first row, in the same situation as in the last row of Table 1, two channels are erroneous and incoherent so that the voter receives the values "10", "8", and "13". Because of the go-ahead processing logic made available to it, it qualifies the values "8" and "13" as erroneous and delivers the value "10" in step 4.

With a different type of processing logic, as shown in the second row, it is the value "8" that is qualified as being valid and that is delivered in step 4.

Similarly, in a third case of processing logic, as shown in row 3, it is the value "13" that is delivered.

It can thus be seen that implementing a go-ahead logic processing stage makes it possible to experience situations in which the global value does not reflect reality, a situation that can have severe consequences for the system as a whole. This can be seen more clearly from the following five rows of this table.

Thus, if two channels are erroneous and coherent, the voter will receive the data value "30" once and the value "8" twice. The value received twice is in the majority, so the voter qualifies it as being valid and delivers the global data value "8".

In the following row, if two channels have been lost, there remains only the value "10", which is delivered as being the global value.

In the following row, one channel is erroneous and one channel is lost. The voter receives the values "10" and "8". It does not know how to qualify them, and it is therefore not in a position to deliver a global value.

In the presence of a go-ahead logic stage, in a first case, if one channel is erroneous and another channel is lost, the voter receiving only the values "10" and "8" qualifies the value "8" as false and therefore delivers the global value "10".

However, in a second case, shown in the last row, the voter qualifies the value "8" as valid and delivers it as the global value.

Table 3 below applies to the same scenarios in the situation where the voter receives individual data values that are of Boolean type. It is considered below that reality corresponds to a "True" value, such that the vote system should normally deliver the "True" value as the global value.

TABLE 3

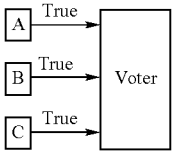

TABLE 3-continued

| Scenario | Step 1 | | Step 4 |
|---|---|---|---|

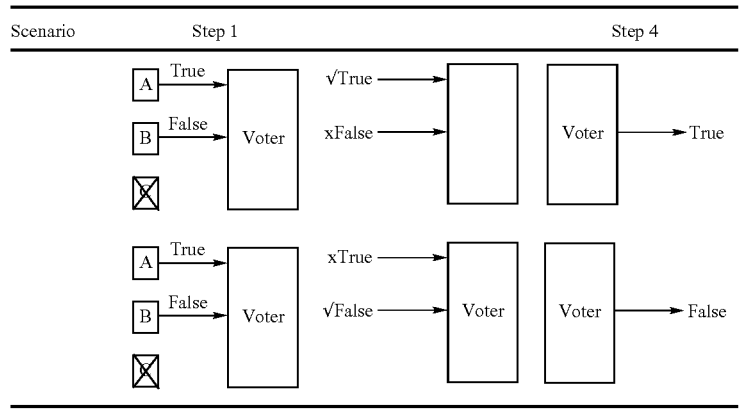

Thus, in the nominal scenario, all of the applications provide the "True" value so the global value delivered by the voter is the "True" value.

In the following row, one channel is erroneous and delivers the "False" value to the voter. This value is qualified as being erroneous by the voter since it is in the minority. The voter then delivers the "True" value as the global value.

In the following row, one channel is lost. The two individual values received by the voter are "True". The same therefore applies to the global value.

In the following row, two channels are erroneous and therefore provide the voter with the "False" value. The voter qualifies them as being valid since they are in the majority and it therefore delivers the "False" value as the global value.

Next, two channels are lost and the voter receives only the "True" value. This is the value that it delivers as the global value.

Thereafter, one channel is erroneous and another is lost. The voter thus receives only the "True" value and the "False" value. It is not in a position to qualify them and therefore cannot deliver a global value.

In this scenario, it is possible to provide a first case of go-ahead logic processing. The voter qualifies the "True" value as valid and therefore delivers it as the global value.

With the second case of go-ahead logic processing, as shown in the last row, the voter qualifies the "False" value as valid and delivers that as the global value.

As can be seen from these two tables, the consequences of multiple failures in the system depend on the type of the individual data values used. For example, in a four-application architecture, if the individual data values can take a plurality of values (as when numerical data is used), then two applications may send erroneous data values to the voter that are not the same. Thus, if the correct value is "10", while one of the wrong values is "8" and another is "13" then there is no voting tie since two of the applications have delivered the value "10", one has delivered the value "8", and the last has delivered the value "13". The voter is then sometimes in a position to deliver the correct value. However, if the individual values can take on only two values (as applies with Boolean type data), then both erroneous applications will be sending the same wrong data to the voter. That leads to a voting tie so that the voter is not in a position to choose the correct solution. Given that the impact of erroneous data is worse in the presence of Boolean data than in the presence of data of other types, this situation is considered in greater detail below. Nevertheless, it should be understood that the invention is not restricted to this type of data.

Failure Conditions with a Four-Channel Architecture

Table 4 below relates to a four-channel system.

TABLE 4

| Scenario | Step 1 | Step 2 & 3 | Step 4 |
|---|---|---|---|
| Nominal | | | |
| 1 erroneous channel | | | |

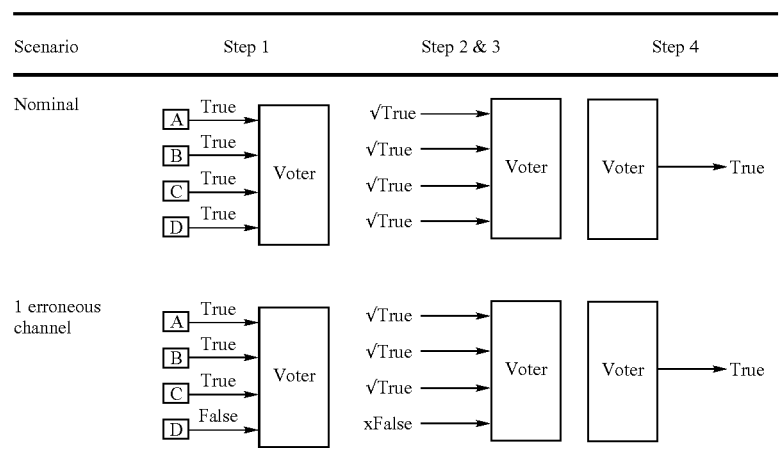

TABLE 4-continued

| Scenario | Step 1 | Step 2 & 3 | Step 4 |
|---|---|---|---|
| 1 erroneous channel | A True, B True, C True, D False → Voter | √True, √True, √True, xFalse → Voter | Voter → True |
| 1 channel lost | A True, B True, C True, ☒ → Voter | √True, √True, √True → Voter | Voter → True |
| 2 erroneous channels | A True, B True, C False, D False → Voter | ?True, ?True, ?False, ?False → Voter | Voter → ? |
| 2 erroneous channels With go-ahead logic (case 1) | A True, B True, C False, D False → Voter | √True, √True, xFalse, xFalse → Voter | Voter → True |
| 2 erroneous channels With go-ahead logic (case 2) | A True, B True, C False, D False → Voter | xTrue, xTrue, √False, √False → Voter | Voter → False |
| 2 channels lost | A True, B True, ☒, ☒ → Voter | √True, √True → Voter | Voter → True |
| 1 erroneous channel and 1 lost | A True, B True, C False, ☒ → Voter | √True, √True, xFalse → Voter | Voter → True |
| 3 erroneous channels | A True, B False, C False, D False → Voter | xTrue, √False, √False, √False → Voter | Voter → False |
| 3 channels lost | A True, ☒, ☒, ☒ → Voter | √True → Voter | Voter → True |

TABLE 4-continued

| Scenario | Step 1 | Step 2 & 3 | Step 4 |
|---|---|---|---|
| 2 erroneous channels and 1 lost | A True, B False, C False → Voter | xTrue, √False, √False → Voter | Voter → False |
| 1 erroneous channel and 2 lost | A True, B False → Voter | ?True, ?False → Voter | Voter → ? |
| 1 erroneous channel and 2 lost With go-ahead logic (case 1) | A True, B False → Voter | √True, xFalse → Voter | Voter → True |
| 1 erroneous channel and 2 lost With go-ahead logic (case 2) | A True, B False → Voter | xTrue, √False → Voter | Voter → False |

In the nominal scenario, all four channels provide the "True" value as their individual values so the voter delivers the "True" value as the global value, and this corresponds to reality.

In the following row, one channel is erroneous, delivering the "False" value. Since it is identified as being in the minority by the voter, it is qualified as being invalid. The voter therefore forwards the "True" global value.

In the following row, one channel is lost. In the presence of three "True" values, the voter provides the "True" global value.

In the fourth row, two channels are erroneous, both providing the "False" value. The voter thus receives the "True" value twice and the "False" value twice. When the votes are tied in this way, it is not possible to provide a global value.

In the following row, a first case of go-ahead logic processing is envisaged for mitigating this scenario. By means of this logic, the voter qualifies the "True" values as delivered by the first two applications as valid and it therefore provides the "True" value as the global value.

With the other case of go-ahead logic processing, the voter makes the opposite choice, finding valid the individual values delivered by the erroneous channels, and it therefore delivers the "False" value as the global value.

In the following row, two channels are lost. The voter thus receives two "True" values simultaneously and it delivers a "True" global value.

Thereafter, one channel is erroneous and another channel is lost. The voter receives two "True" values and one "False" value. It qualifies the "False" value as invalid since it is in the minority and therefore provides the "True" value as the global value.

In the following row, three channels are erroneous. The voter thus receives one "True" value and three "False" values. The "False" values are in the majority so they are qualified as being valid and "False" is delivered as the global value.

Next, three channels are lost. The only value received by the voter is "True", such that "True" constitutes the global value.

Next, two channels are erroneous and one channel is lost. The voter thus receives the "True" value once and the "False" value twice. Since the "False" value is in the majority, it is delivered as the global value.

In the scenario where one channel is erroneous and two channels are lost, the voter receives the "True" value once and the "False" value once. In the presence of such a tie, the voter is not in a position to provide a global value.

In the same scenario together with a first case of go-ahead logic processing, the voter qualifies the "True" value as valid and therefore forwards "True" as the global value. However, with the second case of go-ahead logic processing, shown in the last row of the table, it is the "False" value that the voter validates and forwards as the global value.

Generalizing Failure Conditions for an N-Channel Architecture

It is easy to generalize the question by analogy with an n-channel architecture. A failure that leads to the loss of one channel makes the scenario identical to that of an architecture having n−1 channels.

Thus, a basic vote system can cope appropriately with failure situations providing they lead to the "True" value being delivered by a majority of channels. In contrast, it is necessary to select a logic architecture for coping with failures that lead to a scenario in which votes are tied, i.e. a situation in which the voter is faced with equal numbers of "True" and "False" values. Finally, the vote system is not capable of coping with failure scenarios that lead to receiving a majority of "False" values from the channels.

It can thus be seen that this type of architecture is sufficiently robust to cope with certain failure situations in which only a minority of channels are erroneous or lost. However it is not satisfactory in failure situations that lead to tied votes.

SUMMARY OF THE INVENTION

An object of the invention is to provide a vote system that copes with a larger number of failure scenarios amongst applications. Preferably, the idea is to be capable of providing a global value in a larger number of scenarios, with the values thereof usually matching reality.

To this end, the invention provides a method of controlling an aircraft, in which a device implements the steps consisting in:
  determining a first global value on the basis of only some amongst first individual values calculated by respective applications;
  modifying at least one parameter to take account of how the determination step took place; and
  determining a second global value on the basis of second individual values calculated by the respective applications and on the basis of the parameter(s).

Thus, account is taken of the way in which at least one earlier determination step took place in order to improve the way in which at least one subsequent determination step takes place. The vote thus takes account of voting history. It then becomes possible to cope with the situation of a tied vote, and above all to do so while providing a global value that is reliable.

Furthermore, given that the system is capable of coping with a tied-vote scenario, the invention has the additional advantage of making it possible to use a number of channels, i.e. a number of applications, that is of the even type. It is then possible to host two applications within a single computer. For example, it is more advantageous to have two computers hosting a total of four applications than to have three applications running in three respective computers.

Advantageously, the first global value is identical to a majority, preferably an absolute majority, of the first individual values.

Thus, the parameter is modified to take account of the way in which a determination step took place, providing that step reveals a majority situation, and preferably only if said condition is satisfied. Thus, it is situations that are deemed to be the most reliable that are used for building up the history that is taken into account during subsequent determination steps.

Preferably, the determination first step is implemented without taking account of the parameter(s).

The parameter is thus modified to take account of the way in which a determination step took place if, during said step, no parameter was taken into account. Thus, once more, it is only the most healthy situations that are taken into account for influencing subsequent situations.

Advantageously, the or each parameter is a weighting coefficient allocated to one of the applications.

Preferably, during the modification step, the device modifies the or each parameter associated with an application that calculated a first individual value that was different from the first global value, and preferably leaves the or each other parameter unchanged.

Advantageously, during the modification step, the or each parameter for modification is modified by being multiplied by a predetermined factor, which factor is preferably independent of the parameter and/or of the number of times the parameter has already been modified.

Advantageously, the modification step is implemented without setting a limit for the parameter.

Advantageously, the method is implemented only during a predetermined stage in the operation of the aircraft.

Preferably, during the second determination step, the individual values are such that either they are two in number and different from each other, or else they are distributed in value groups, the values in any one group being mutually identical and different from those in the other groups, the groups having the highest cardinal number being at least two in number and having the same cardinal number.

Thus, use is made of the parameter(s) representing voting history if there is a voting tie and therefore no majority. Preferably, it is only in this type of situation that use is made of the parameter(s).

Advantageously, the parameters are reinitialized at the end of a predetermined stage in the operation of the aircraft.

The invention also provides a computer program comprising code instructions suitable for causing the method of the invention to be executed when the program is executed on a computer. The invention also provides a data recording medium including such a program in recorded form, and it also provides making such a program available on a telecommunications network for downloading purposes.

The invention also provides a device for controlling an aircraft, the device being suitable for:
  determining a first global value on the basis of only some amongst first individual values calculated by respective applications;
  modifying at least one parameter to take account of the way in which the determination step took place; and
  determining a second global value on the basis of second individual values calculated by the respective applications and on the basis of the parameter(s).

The invention also provides a system for controlling an aircraft, the system comprising such a device and applications suitable for providing the device with the individual values, the number of applications preferably being even.

The invention also provides an aircraft including such a device or such a system.

BRIEF DESCRIPTION OF THE DRAWING

Other characteristics and advantages of the invention appear further from the following description of a preferred embodiment and of variants given as non-limiting examples with reference to the accompanying drawing, in which.

GENERAL DESCRIPTION OF THE EXAMPLE

Figure 1:
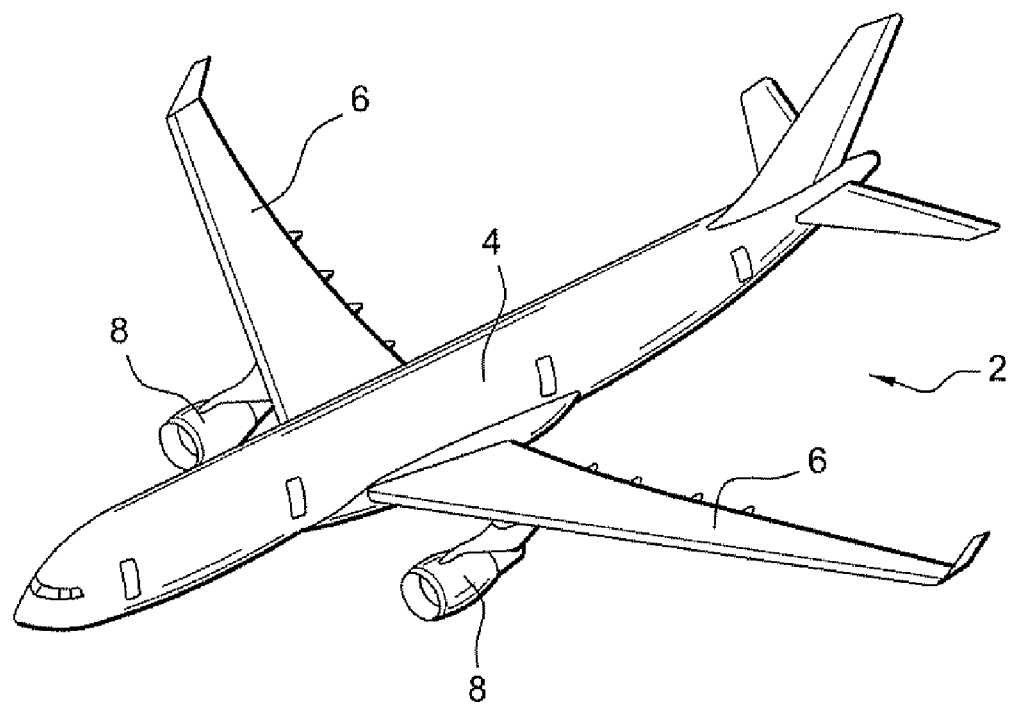
FIG. 1 is a perspective view of an airplane having the method of the invention implemented thereon.

In the present example, the vehicle 2 on which the method of the invention is applied is an aircraft, and more precisely an airplane having a fuselage 4, two wings 6, and jet engines 8, there being two jet engines in this example.

The airplane has on-board computers suitable, at least under certain circumstances, for controlling the aircraft in full or in part. Control may also be provided in full or in part by one or more pilots. There follows a description with reference to FIG. 2 of a vote system 9 of the airplane 2, which system includes some of said computers.

Figure 2:
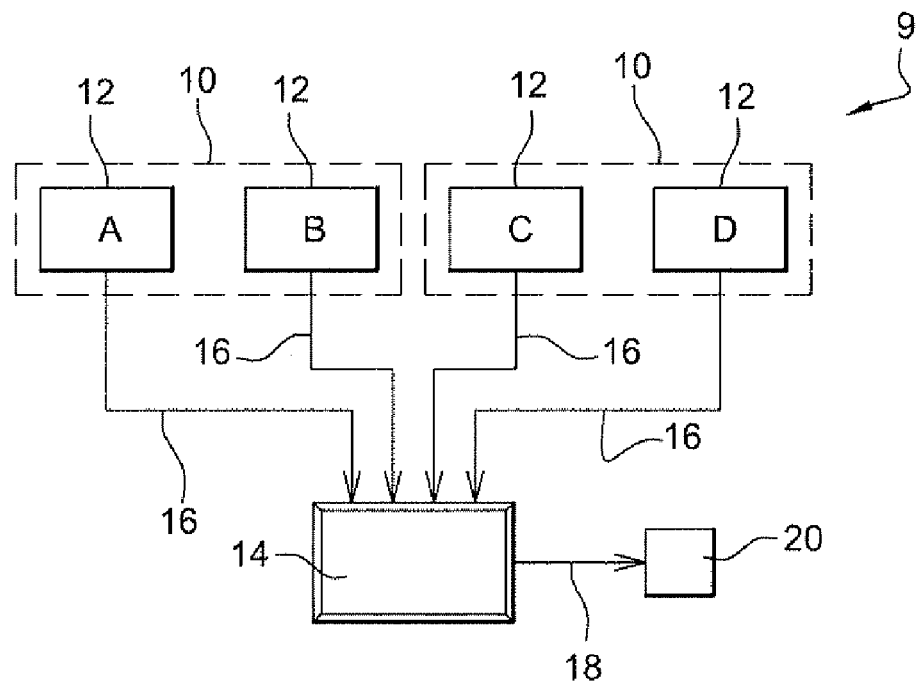
FIG. 2 is a block diagram of a vote system of the FIG. 1 airplane, implementing the method of the invention.

Thus, FIG. 2 shows two computers 10, each hosting two software applications 12 so that the total number of applications is four. The system also comprises a device 14 such as a computer hosting an application that performs the voter function or vote organizing function. The computers 10 and the voter 14 are arranged in such a manner that the voter can receive data values 16, referred to herein as "individual" values, that are delivered by the respective applications 12. These values are determined, e.g. calculated, by each of the applications on the basis of raw data obtained upstream (by calculation, by measurement, or from some other member, etc.). At the end of voting in the context of the method that is described below, the voter 14 provides a data value 18 that is referred to herein as the "global" value, which value is delivered to a device 20 of the aircraft for use in controlling technical functions of the airplane.

As explained below, the method of the invention serves to improve the voting results in dynamic manner. Thus, the results of earlier votes are taken into account in order to improve the reliability of subsequent votes implementing the same applications. Use is thus made of voting history in order to better identify the application(s) presenting behavior that is faulty, suspect, or merely not as good as that of the other applications. The method thus makes it possible to detect erratic behavior of an application and to take it into account, even if the erratic behavior is not continuous.

In the description below, consideration is given by way of example to a vote that ought normally to lead to a "True" global value. Consequently, applications that provide individual values that are "False" are not operating correctly, unlike those that provide "True" individual values.

In order to take the history into account, the method acts, in certain circumstances, to perform a step that is additional to the four steps described above. This is a storage step. The voter 14 thus implements the following steps on principle:

step 1: reading the individual values 16 provided by each application 12;

step 2: comparing the individual values (in the nominal scenario, all of the values match since the applications 12 have used the same raw data and they apply the same logic);

step 3: eliminating erroneous individual values. Only certain individual values are retained since they are in the majority, possibly after taking account of the voting history of each of the applications, as explained below;

step 4: storing in memory the validity of the values provided by associating various parameters such as weighting coefficients with the applications that have provided an erroneous value and/or those that have provided a correct value (see below); and step 5: transferring the global value 18 that constitutes the result of the function to the device 20 so that it is taken into account in the control process.

Provision can be made for the history that is used to provide assistance in selecting those applications that have provided correct values, itself to be built up from all previous votes or from only some of them.

On each vote, the voter determines firstly whether there is one group of values in the majority compared with the other. In the present example, values that are in the majority are retained as being valid for the purpose of determining the global value 18 and at this stage no use is made of data relating to voting history when performing this determination.

The method of the invention is particularly useful in situations where there is no majority. This may be a situation where the vote is tied, in which case the individual received values are two in number and different from each other. This may also apply to a scenario in which the individual values can be organized in groups of values, with the values in a given group being identical to one another and different from those in other groups, with the groups having the highest cardinal number being two in number and having the same cardinal number. If one or more parameters representing voting history are available, the weight of each result is determined by adding the weights corresponding to the applications that have provided said result. Thus, it is the result having the lowest total weight or the greatest total weight that is finally retained to constitute the global value 18. Depending on circumstances, a heavy parameter or a light parameter is associated with an application 18 that has delivered a vote that has been discredited during one or more earlier votes. Consequently, on this principle, the method of the invention is capable of coping with a situation such as a tied vote.

In a scenario where no majority is available and no voting history is available either (e.g. because all of the parameters are at their initial values and therefore equal), the voter 14 is in a situation where it needs to make a decision using some other type of logic. By way of example, one such logic is worst-case logic, as described below. Naturally, selecting the appropriate logic depends on requirements, which themselves depend on the field of application of the vote system. This selection may comply with certification or reliability constraints, for example.

Each voting operation requires each application to deliver its vote, as constituted by its individual value, at a given instant or within a given period. Under such circumstances, it is possible that one of the applications 12 misses the rendezvous, and it will then be considered as lost by the voter 14. It will thus be considered as being unreliable when history is taken into account. In order to avoid any such "unjustified" history being taken into account, provision may be made in the voter for a certain amount of tolerance concerning the late arrival of votes. Another solution would consist in providing a step of synchronizing the applications in order to avoid such delays.

Selecting Practical Techniques

There are numerous techniques for deciding which techniques to use for allocating, modifying, updating, and reinitializing parameters or weights, and deciding how the parameters are to influence the step in which the voter validates the applications. These techniques may be selected on the basis of the field of application or of the function that is performed, for example.

Firstly, it is possible to decide which parameters are to be affected by a vote, i.e. which parameters are changed by the voter at the end of voting. Various possibilities exist:

a negative weight philosophy: in the nominal scenario, none of the weights are modified, since all of the channels are giving matching values. However as soon as one of them becomes faulty, it delivers a value that differs from the majority of the other values and it is thus its weight that is modified by the voter;

a positive weight philosophy: in the nominal scenario, all of the weights are modified in the same manner since the applications all give matching values. However, should one of them become faulty, its value differs from that of the majority and the voter therefore does not modify the weight of that application;

a (mixed) positive and negative weight philosophy: in the nominal scenario, the weights are all changed in the same manner since the applications all give matching values. However, once of them is corrupted, its value differs from the majority value. The weight of the non-matching application is therefore modified in opposite manner to the manner in which the weights of the other applications are modified. For example if weights are increased in the nominal scenario, then the erroneous application will have its weight decreased.

It is also necessary to decide when it is appropriate to change the weights. Weights can be updated or modified only after a vote has been taken. However there is no need to make the modification after every vote. Here, there are two more potential philosophies:

in a systematic updating philosophy, the weights are modified after each vote and therefore take account of the history of all of the votes;

in a philosophy of modifying only in the event of a majority, the weights are modified only if the most recent vote has not required any account to be taken of the weight(s), i.e. has not required any account to be taken of the history, given that a majority exists. This philosophy avoids storing errors that stem from wrong interpretation of voting history.

Furthermore, airplane computers do not start up instantaneously, and there exists an initialization or start-up period. However, certain computers or certain applications may operate during a start-up stage so that the data they deliver to the remainder of their environment is not up to date and is therefore erroneous. Disturbances can then appear between channels. These disturbances should not be stored since they are not the result of failures. That is why, during this period, arrangements are made to prevent them sending data so that they appear to be "inactive" to their environment. Under such circumstances, it is advantageous to provide a nominal stage in the method during which all of the channels participate in voting. Outside this stage, votes may be taken but they are not taken into account for storing the history.

Furthermore, when certain channels are busy or switched off (e.g. when an application has been stopped), their weights should not be updated because they are failing to provide correct values. They are not providing any values. These channels need to be eliminated when computing the votes and voting results for as long as they remain inactive or switched off.

Furthermore, there are various ways in which the parameters can be modified.

Firstly, it is necessary to select between reducing or increasing: this selection, associated with the negative weight or positive philosophies, serves to define whether it is the channels with the greatest weights or the smallest weights that are deemed to be more reliable in the event of a tied vote. Under such circumstances, the parameter is respectively either increased or reduced in the event of the channel being deemed reliable.

It is also possible to select between modification that is incremental (stepwise) or geometrical (by a coefficient). It is thus possible to decide that a parameter should be modified by being increased or decreased by an increment or else by being multiplied by a factor, where the increment or the factor is preferably constant and invariable. The weight is then either increased or decreased by an increment, or else a coefficient is applied thereto. This choice has consequences on the variability of the amplitude of each increase or each decrease of a parameter. These two possibilities have their respective limits. Incremental modification is limited by the greatest or smallest values that can be stored. Geometrical modification is limited by the accuracy of the voter memory. It is therefore important to select a technique that restricts the system as little as possible as a function of the characteristics of its physical memory.

It is also necessary to decide whether the parameters are modified while remaining within a predetermined range, or on the contrary without any limit. It is thus necessary to decide whether each parameter remains within a predetermined range and therefore ceases to increase or to decrease on reaching one of the bounds of the range, or else is to be allowed to increase or decrease without limit.

There also exist various techniques for reinitializing the parameters. For example, with weighting coefficients, such reinitialization may consist in setting all of the coefficients to the value 1.

The question of reinitialization arises in particular in the event of maintenance tasks being performed. Maintenance work may be performed in order to mitigate the loss or the corruption of a channel. Such work consists, for example, in replacing the channel with a new channel. That may involve replacing one or more sensors, replacing the computer that hosts the application, replacing means enabling the application to communicate with an on-board network, or indeed replacing connectors or memories. In the context of such maintenance, the software may also be updated, by adding a patch or additional software, or indeed by replacing software with other software. If such a maintenance operation takes place, it is preferable to delete the history of the channel that has been subjected to maintenance. The causes of the wrong values that have led to a difference in weight have now been eliminated.

Apart from maintenance operations, other situations can also exist that require the parameters to be reinitialized, e.g. as a function of the field of application.

For example, with an aircraft, provision may be made to reinitialize all of the parameters automatically on flight closure. Such reinitialization may also take place at the end of a predetermined stage of flight. Flight stages are provided on board in order to improve flight operation. Provision can then be made for the end of one stage of flight to lead to the channel weights being reinitialized. Providing for channel reinitialization to be automatic serves to ensure that this operation is not forgotten as might happen if it were purely under manual control, i.e. controlled by an operator or a pilot.

The implementation of the method of the invention is described below with reference to Table 5. In order to examine the effects of an application failing, consideration is given to two types of architecture prior to generalizing to an arbitrary number of channels. The description is simplified by assuming that the channels provide individual values that are of Boolean type. Naturally, the invention also applies to values of some other type, e.g. numerical values.

In addition, no consideration is given to the possibility of erratic behavior occurring simultaneously on two channels without either of them previously presenting a failure. Thus, in the event of a tied vote, it is assumed that there is a difference in the weights of the channels. The scenario that is ignored herein is that of a tie occurring without any history, but that scenario presents a very low probability of occurring. It is assumed that the expected normal value or the value that corresponds to reality is "True".

TABLE 5

| Scenario | Step 1 | | Step 4 |
|---|---|---|---|
| Nominal | 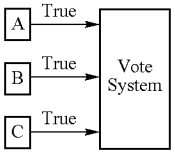 | | |
| 1 erroneous channel | 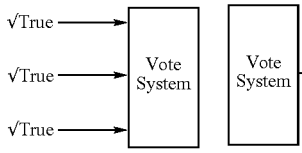 | | |
| 1 channel lost | 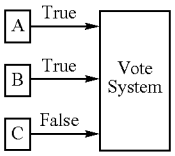 | | |
| 2 erroneous channels | 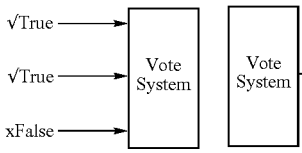 | | |
| 2 channels lost | 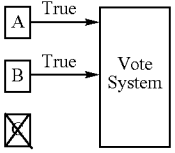 | | |
| 1 erroneous channel and 1 lost | 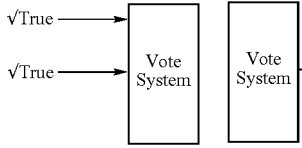 | | |

In the nominal scenario, all of the channels 12 deliver "True" individual values 16. That value is delivered by the voter 14 as the global value 18.

In the second row, if one channel is erroneous and provides the "False" value, this is identified as being in the minority by the voter and is thus invalidated. The voter thus provides a "True" global value.

If one channel is lost, the voter receives only two "True" individual values and therefore provides a "True" global value.

If two channels are erroneous, the voter receives the "True" individual value once and the "False" individual value twice. The "False" value is in the majority so it is validated and delivered as the global value.

If two channels are lost, the voter receives only one "True" value. It validates it and delivers a "True" global value.

Finally, in the last row, if one channel is erroneous and one channel is lost, the voter receives simultaneously a "True" individual value and a "False" individual value. This involves a tied vote. By taking account of the voting history, as described in greater detail below, the voter 14 can determine that it is the "True" value that is to be validated while the "False" value is to be disqualified. It therefore delivers the "True" global value.

In Table 6 below, analogous scenarios are examined for a four-channel architecture.

TABLE 6

| Scenario | | | | | Step 4 |
|---|---|---|---|---|---|
| Nominal | A True, B True, C True, D True → Vote System | √True, √True, √True, √True → Vote System | Vote System | → True | |
| 1 erroneous channel | A True, B True, C True, D False → Vote System | √True, √True, √True, xFalse → Vote System | Vote System | → True | |
| 1 channel lost | A True, B True, C True, ☒ → Vote System | √True, √True, √True → Vote System | Vote System | → True | |
| 2 erroneous channels | A True, B True, C False, D False → Vote System | √True, √True, xFalse, xFalse → Vote System | Vote System | → True | |
| 2 channels lost | A True, B True, ☒, ☒ → Vote System | √True, √True → Vote System | Vote System | → True | |
| 1 erroneous channel and 1 lost | A True, B True, C False, ☒ → Vote System | √True, √True, xFalse → Vote System | Vote System | → True | |
| 3 erroneous channel | A True, B False, C False, D False → Vote System | xTrue, √False, √False, √False → Vote System | | → False | |
| 3 channels lost | A True, ☒, ☒, ☒ → Vote System | √True → Vote System | Vote System | → True | |
| 2 erroneous channel and 1 lost | A True, B False, C False, ☒ → Vote System | xTrue, √False, √False → Vote System | Vote System | → False | |

TABLE 6-continued

| Scenario | Step 4 |
|---|---|
| 1 erroneous channel and 2 lost | 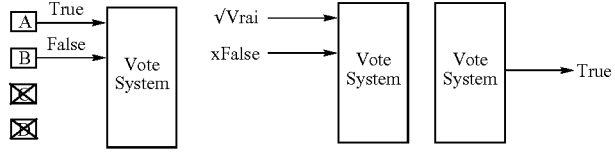 |

In the nominal scenario, the voter 14 that has received the "True" individual value 16 four times delivers the "True" global value 18.

In the second row, one channel is erroneous and, unlike the others, it delivers the "False" value to the voter. Since the "True" value is in the majority, the global value as delivered is "True".

If one channel is lost, the voter receives the "True" individual value three times and delivers the "True" value as the global value.

If two channels are erroneous, the voter receives the "True" individual value twice and the "False" individual value twice. Because voting history is taken into account, it is in a position to identify the "True" values as valid, unlike the "False" values, and it therefore delivers the "True" global value.

If two channels are lost, the voter receives the "True" individual value twice and delivers the "True" value as the global value.

If one channel is erroneous and one channel is lost, the voter receives the "True" individual value twice and the "False" individual value once. Since the "False" value is in the minority, the global value as delivered is "True".

If three channels are erroneous, the voter receives the "True" individual value once and the "False" individual value three times. Since the "False" value is in the majority, the voter delivers the "False" global value.

If three channels are lost, the voter receives only the "True" individual value and it delivers the "True" value as the global value.

If two channels are erroneous and one channel is lost, the voter receives the "False" value twice and the "True" value once. Since the "False" value is in the majority, it is the "False" value that is delivered as the global value.

Finally, if one channel is erroneous and two channels are lost, the voter receives the "True" value once and the "False" value once. In the presence of such a voting tie, and because the history is taken into account, the voter delivers the "True" global value.

The operation of the system is easily generalized by analogy to an architecture having n channels. Thus, in an n-channel architecture, a scenario in which one channel is lost becomes equivalent to the scenario for an architecture having n−1 channels.

The method of the invention can cope with failures that lead to a majority of "True" votes and a minority of "False" votes. However, and above all, the method is also capable of coping with failures that lead to a voting tie (same number of "True" and "False" votes) because it takes the history into account. As before, the method does not give a correct response if the failures lead to a majority of "False" votes. It can thus be seen that the method of the invention is capable of coping with the same failure scenarios as those that are already suitably handled by a conventional vote system. However it is also capable of coping with a scenario involving a voting tie.

As a result, it becomes possible to make use of an architecture in which the number of channels is even. It is thus possible to provide a number of computers that is equal to half the number of applications, each computer hosting two applications.

There follows a description of a concrete implementation of the invention on board the airplane 2 using the system shown in FIG. 2. On board such an aircraft, there exists a system that monitors most of the main on-board systems. It is the flight warning system (FWS). Its architecture is as shown in FIG. 2 and it implements a voting system having a plurality of instances 12. During a flight, is not impossible that hardware problems might occur in at least one of the computers hosting the system. Such a problem can lead to a serious warning being triggered with pointless countermeasures being implemented on board that might themselves lead to a reduction in the flying performance or the fuel range of the airplane. In the present example, each of the applications 12 is a module for detecting failures in one of the main systems of the airplane.

As described above, in this example, it is the negative weight philosophy that is selected with parameters being updated only in the event of the votes not all being equal. The parameters are weighting coefficients allocated to the respective applications 12 and they are free to vary without any predetermined limit. In this example, each time a coefficient is modified, it is multiplied by a factor that is equal to 0.9, which means that it is decreased. Finally, the weights are reinitialized at the beginning of the last stage of flight.

The steps of the method are shown in Table 7 below. Each row shows the procedure whereby a decision is taken in a plurality of steps represented by the four columns. Unlike the tables above, this table does not show a set of scenarios. The situations in rows 1 to 4 are cycles that occur in succession and in chronological order in the process used as an example. This table thus constitutes a single scenario.

The four channels of the FIG. 2 architecture are identified by the letters A, B, C, and D. The term No "Fail" means that the channel in question has not detected any failure in the systems it is monitoring. The term "Fail" means, on the contrary, that the channel has detected the existence of a failure on one of the monitored systems. In this scenario, it is assumed that, in fact, no failure has occurred. Consequently, each detection of a failure is merely a spurious warning.

TABLE 7

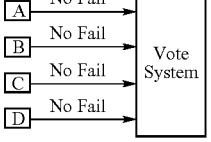

During the first decision, in the first row, all of the channels 12 deliver the "No Fail" value 16 to the voter 14. In the presence of such unanimity, the voter validates all of the votes 16. In step 4, each of the coefficients for weights A, B, C, and D, initially at the value "1", is reinstated with the same value. In step 5, the voter 14 delivers a "No Fail" global value 18.

Thereafter, on a subsequent delivery of individual values, as shown in the second row, channel D, unlike the other three channels, provides the voter with the "Fail" value. The voter thus has three "No Fail" votes against one "Fail" vote. Since the "No Fail" votes are in the majority, they are qualified as being valid, unlike the "Fail" vote. In the following step 4, the voter thus leaves the weights of channels A, B, and C unchanged (at the value "1"), while it multiplies the weight of channel D by a coefficient of 0.9. This weight is thus changed to the value "0.9". In step 5, the voter delivers the "No Fail" global value.

Thereafter, in the third row, once more the channels A, B, and C provide the "No Fail" individual value to the voter, while the channel D provides the "Fail" value. As before, the voter identifies the "No Fail" vote as being in the majority and it considers them as being valid, unlike the "Fail" vote. The weights A, B, and C are thus left identical, still at the value "1". Once more, because of its minority situation, channel D has its weight multiplied by the same factor 0.9 so as to be changed to the value "0.81". The voter finally delivers the "No Fail" global value.

Finally, in row 4, the channels A and B deliver the "No Fail" value to the voter while the channels C and D deliver the "Fail" value. It can be seen that in step 2 the voter is faced with a voting tie: there is a first group of two votes corresponding to the "No Fail" value, and a second group of two votes corresponding to the "Fail" value. In such a situation, the voter takes account of the voting history, and more precisely of the weights of the channels A, B, C, and D. Thus, it calculates the sum of the weights of the channels that gave the "No Fail" value. This sum is equal to 2. Likewise, it calculates the sum of the weights of the channels that gave the "Fail" value, which sum is equal to 1.81. The sum of the weights of the first two channels is thus greater than the sum of the weights of the second two channels. The voter therefore considers the first two votes as being valid and considers the second two votes as being invalid. In step 4, the weights of all of the channels are left unchanged. It can thus be seen that at the end of this voting tie situation, the weights are not modified. In step 5, the voter finally delivers the "No Fail" global value.

This implementation can thus be described as follows.

In the first row, a global value 18 is determined on the basis of the individual values 16 calculated by the respective applications 12. This determination, resulting from unanimity, does not lead to any of the parameters being modified.

In the second row, a global value is determined once more, this time solely on the basis of some of the individual values calculated by the respective applications. This global value is identical to the absolute majority of the individual values. This determination is performed without taking account of parameters representing voting history. After this vote that reveals a majority situation, at least one of the parameters is modified in order to take account of the way in which this most recent determination step took place. For this purpose, the parameter associated with the application 12 that provided the value 16 that differed from the global value 18 is modified while the other parameters are left unchanged. The parameter is modified by being multiplied by a predetermined factor that is independent of the parameter and of the number of times the parameter might already have been modified.

In the third row, a determination step is performed once more, and that leads to a majority situation and to one of the parameters being modified.

Finally, in the fourth row, a global value is determined on the basis of individual values calculated by the applications. It is found that the individual values received by the voter can be distributed in two value groups, the values in any one group being mutually identical and different from the values in the other group, and the group having the highest cardinal number being two in number and both of them having the same cardinal number. That is why the determination this time takes account of the parameters in order to provide the global value.

It can be seen that the method can be implemented in such a manner that the parameter(s) is/are updated not after each vote, but only after certain votes. Furthermore, it is only in certain types of decision that any account is taken of the parameters representing voting history in order to determine the global value.

The method of the invention may be implemented by means of a program comprising code instructions. When executed on a computer, the program is suitable for implementing the steps of the method. The program may be recorded on a data recording medium such as a compact disk (CD) or a digital video disk (DVD), a hard disk, or a flash memory. Finally, provision may be made to make the program available on a telecommunications network for downloading purposes.

The method of the invention may be associated with a "worst-case" logic. In an architecture of the kind shown in FIG. 2, such a logic makes it possible to resolve voting disagreements between the channels. There are various ways in which worst-case logic can be implemented, but the principle remains the same: the idea is to evaluate the impact of each possibility and to retain the possibility that gives rise to the consequences that are the least severe. Naturally, it is necessary to perform in-depth analysis of the function performed by system in order to identify all possible behaviors and their respective consequences.

Such a logic may be applied to monitoring systems. One of them, referred to as a warning system, sends a warning to operators as soon as the monitored systems do not behave properly. After such a warning, the operators need to confirm the warning, and then to implement the appropriate procedure in order to put the airplane back in a safe domain.

In such a system, triggering a spurious warning involves an increase in the work load of the operators. They need to diagnose the situation and then invalidate the warning. It also gives rise to a loss of confidence in the system. In contrast, failures that pass undetected give rise to a dangerous situation. That is why, in a so-called "worst-case" logic, if only one of the channels detects an error, a warning is triggered even if the majority of the channels do not detect it.

This type of logic is used above all as a backup solution or degraded mode for coping with problems that would otherwise have been insoluble. For example, a voting system cannot normally resolve a situation in which a combination of errors leads to a voting tie. Under such circumstances, applying worst-case logic makes it possible to define which channel should be selected. Such worst-case logic can be used in association with the method of the invention that, a priori, makes use of voting history in the event of a voting tie. When used, the worst-case logic replaces taking account of voting history.

The invention enables the safety objectives imposed on aircraft to be satisfied better. It is better at coping with critical situations. The method of the invention is particularly advantageous, given the observed multiplication of on-board communications connections, the number of applications and equipments in use, the monitoring operations involved, and phenomena of physical or software segregation.

Naturally, numerous modifications may be applied to the invention without going beyond the ambit thereof.

Provision may be made for the voting system to co-operate with a number of computers 10 that is equal to one or greater than two. The number of applications 12 may be equal to two, three, four, five, or more.

What is claimed is:

1. A method of controlling an aircraft, comprising:
    determining a first global value on the basis of more than one, but not all, first individual values, each of the first individual values calculated by its respective applications; then
    analyzing results of the determining of the first global value; then
    modifying at least one parameter to take account of how the determination step took place; and then
    determining a second global value on the basis of second individual values, each of the second individual values calculated by its respective applications, and additionally on the basis of the at least one parameter,
    wherein a device implements the determining a first global value, analyzing, modifying, and determining a second global value steps.

2. A method according to claim 1, wherein the first global value is identical to a majority of the first individual values.

3. A method according to claim 2 wherein the majority is an absolute majority.

4. A method according to claim 1, wherein the first determination step is implemented without taking account of the at least one parameter.

5. A method according to claim 1, wherein the at least one parameter is a weighting coefficient allocated to one of the respective applications.

6. A method according to claim 1, wherein, during the modification step, the device modifies the at least one parameter associated with one of the respective applications that calculated a first individual value that was different from the first global value.

7. A method according to claim 6 wherein during the modification step the device leaves at least one other parameter unchanged.

8. A method according to claim 1, wherein, during the second determination step, the second individual values are such that either they are two in number and different from each other, or else they are distributed in value groups, the values in any one group being mutually identical and different from those in the other groups, the groups having the highest cardinal number being at least two in number and having the same cardinal number.

9. A computer program embodied on a non-transitory computer readable medium for controlling the implementation of a method when executed on a computer, the method comprising:
    determining a first global value on the basis of more than one, but not all, first individual values, each of the first individual values calculated by its respective applications; then
    analyzing results of the determining of the first global value; then
    modifying at least one parameter to take account of how the determination step took place; and then
    determining a second global value on the basis of second individual values, each of the second individual values calculated by its respective applications, and additionally on the basis of the at least one parameter, wherein a device implements the determining a first global value, analyzing, modifying, and determining a second global value steps.

10. A device for controlling an aircraft, wherein the device comprises:
    determining a first global value on the basis of more than one, but not all, first individual values, each of the first individual values calculated by its respective applications;
    analyzing results of the determined first global value;
    modifying at least one parameter to take account of the way in which the determination step took place; and
    determining a second global value on the basis of second individual values, each of the second individual values calculated by its respective applications and additionally on the basis of the at least one parameter.

11. A system for controlling an aircraft, the system comprising a device and applications for providing individual values to the device, wherein the device comprises:
    determining a first global value on the basis of more than one, but not all, first individual values, each of the first individual values calculated by its respective applications;
    analyzing results of the determined first global value;
    modifying at least one parameter to take account of the way in which the determination step took place; and
    determining a second global value on the basis of second individual values, each of the second individual values calculated by its respective applications and additionally on the basis of the at least one parameter.

12. A system according to claim 11 wherein the number of applications is even.

13. An aircraft including a device for controlling an aircraft, wherein the device comprises:
    determining a first global value on the basis of only more than one, but not all, first individual values, each of the first individual values calculated by its respective applications;
    analyzing results of the determining of the first global value;
    modifying at least one parameter to take account of the way in which the determination step took place; and
    determining a second global value on the basis of second individual values, each of the second individual values calculated by its respective applications and additionally on the basis of the at least one parameter.

* * * * *